United States Patent
Carceroni

(10) Patent No.: US 10,212,338 B2
(45) Date of Patent: Feb. 19, 2019

(54) CAMERA OPERABLE USING NATURAL LANGUAGE COMMANDS

(71) Applicant: Google Inc., Mountain View, CA (US)

(72) Inventor: Rodrigo Carceroni, Mountain View, CA (US)

(73) Assignee: Google LLC, Mountain View, CA (US)

(*) Notice: Subject to any disclaimer, the term of this patent is extended or adjusted under 35 U.S.C. 154(b) by 102 days.

(21) Appl. No.: 15/358,770

(22) Filed: Nov. 22, 2016

(65) Prior Publication Data
US 2018/0146133 A1    May 24, 2018

(51) Int. Cl.
| | |
|---|---|
| *H04N 5/232* | (2006.01) |
| *G10L 15/22* | (2006.01) |
| *G10L 15/26* | (2006.01) |
| *G10L 15/18* | (2013.01) |
| *G06K 9/00* | (2006.01) |

(52) U.S. Cl.
CPC ..... *H04N 5/23222* (2013.01); *G06K 9/00221* (2013.01); *G06K 9/00355* (2013.01); *G06K 9/00919* (2013.01); *G10L 15/1822* (2013.01); *G10L 15/22* (2013.01); *G10L 15/265* (2013.01); *H04N 5/23203* (2013.01); *H04N 5/23212* (2013.01); *H04N 5/23219* (2013.01); *H04N 5/23293* (2013.01); *H04N 5/23296* (2013.01); *G10L 2015/223* (2013.01)

(58) Field of Classification Search
CPC ............ H04N 5/23222; H04N 5/23293; G10L 15/265; G10L 2015/223
See application file for complete search history.

(56) References Cited

U.S. PATENT DOCUMENTS

| | | | |
|---|---|---|---|
| 5,027,149 A | 6/1991 | Hoshino et al. | |
| 5,749,000 A | 5/1998 | Narisawa | |
| 6,724,931 B1 | 4/2004 | Hsu | |
| 9,189,680 B2* | 11/2015 | Komatsu | G06K 9/00926 |
| 9,536,159 B2* | 1/2017 | Wu | H04L 67/306 |
| 2010/0231730 A1 | 9/2010 | Ichikawa et al. | |

(Continued)

FOREIGN PATENT DOCUMENTS

| | | |
|---|---|---|
| EP | 2559030 A | 2/2013 |
| JP | 2001305642 A | 2/2001 |

OTHER PUBLICATIONS

Wu et al., "Harnessing Object and Scene Semantics for Large-Scale Video Understanding", IEEE Conference on Computer Vision and Pattern Recognition, Jun. 26-Jul. 1, 2016, 10 pgs.

(Continued)

*Primary Examiner* — Hung H Lam
(74) *Attorney, Agent, or Firm* — Shumaker & Sieffert, P.A.

(57) ABSTRACT

In general, techniques of this disclosure may enable a computing device to capture one or more images based on a natural language user input. The computing device, while operating in an image capture mode, receive an indication of a natural language user input associated with an image capture command. The computing device determines, based on the image capture command, a visual token to be included in one or more images to be captured by the camera. The computing device locates the visual token within an image preview output by the computing device while operating in the image capture mode. The computing device captures one or more images of the visual token.

20 Claims, 5 Drawing Sheets

(56) References Cited

U.S. PATENT DOCUMENTS

| | | | |
|---|---|---|---|
| 2011/0026782 A1* | 2/2011 | Ego | G06K 9/00288 |
| | | | 382/118 |
| 2013/0124207 A1 | 5/2013 | Sarin et al. | |
| 2015/0269420 A1* | 9/2015 | Kim | G06F 21/32 |
| | | | 382/118 |
| 2016/0055371 A1* | 2/2016 | Wu | H04L 67/306 |
| | | | 382/118 |
| 2016/0255268 A1* | 9/2016 | Kang | G06F 3/04845 |
| | | | 348/333.11 |
| 2016/0353031 A1* | 12/2016 | Huang | H04N 5/23293 |
| 2016/0373612 A1* | 12/2016 | Zhang | H04N 1/3878 |
| 2017/0339340 A1* | 11/2017 | De Bayser | H04W 76/10 |

OTHER PUBLICATIONS

Socher et al., "Parsing Natural Scenes and Natural Language with Recursive Neural Networks", Proceedings of the 28th International Conference on Machine Learning, Jun. 28-Jul. 2, 2011, 8 pgs.

Vondrick et al., "Anticipating the future by watching unlabeled video", Massachusetts Institute of Technology, Apr. 29, 2015, 10 pgs.

Hasan et al., "Learning Temporal Regularity in Video Sequences", CVPR 2016, Apr. 15, 2016, 40 pgs.

Jayaraman et al., "Slow and steady feature analysis: higher order temporal coherence in video", Apr. 14, 2016, 16 pgs.

Choi et al., "Video-Story Composition via Plot Analysis", CVPR2016, Jun. 27-30, 2016, 9 pgs.

International Search Report and Written Opinion of International Application No. PCT/US2017/053495, dated Dec. 12, 2017, 16 pp.

Response to Written Opinion dated Dec. 12, 2017, from International Application No. PCT/US2017/053495, dated Mar. 29, 2018, 17 pp.

Davis et al., "From Context to Content: Leveraging Context to Infer Media Metadata," Multimedia '04, Proceedings of be 12th Annual ACM International Conference on Multimedia, Oct. 10-16, 2004, 8 pp.

Second Written Opinion of International Application No. PCT/US2017/053495, dated Oct. 31, 2018, 7 pp.

* cited by examiner

CAMERA OPERABLE USING NATURAL LANGUAGE COMMANDS

BACKGROUND

Some computing devices may rely on presence-sensitive technology for receiving user input to operate a camera of the computing device. For example, a computing device may display a graphical user interface (GUI) for controlling a camera at a touch screen and receive user input at the touch screen to cause the camera to take a picture or video, focus the camera on a particular subject, adjust the flash of the camera, or control some other camera function and/or picture characteristic. Relying on a GUI and presence-sensitive technology as the primary way to control a camera can have drawbacks. For example, while trying to take a picture or video (e.g., of moving object), a user may be too slow in providing his or her inputs at the GUI and may cause the camera to miss the shot. In addition, interacting with a GUI while trying to frame the scene in a camera viewfinder may be cumbersome and somewhat impractical, as inputs to the GUI may cause the device to move which may blur or otherwise adversely affect the quality of the resulting photo or video.

SUMMARY

In one example, the disclosure is directed to a method that includes, while a computing device is operating in an image capture mode, receiving, by the computing device, an indication of a natural language user input associated with an image capture command. The method further includes determining, by the computing device, based on the image capture command, a visual token to be included in one or more images to be captured by a camera of the computing device. The method also includes locating, by the computing device, the visual token within an image preview output by the computing device while operating in the image capture mode. The method further includes capturing, by the computing device, one or more images of the visual token.

In another example, the disclosure is directed to a computing device that includes a camera, at least one processor, and at least one non-transitory computer-readable storage medium storing instructions that are executable by the at least one processor to, while the computing device is operating in an image capture mode, receive an indication of a natural language user input associated with an image capture command. The instructions are further executable by the at least one processor to determine based on the image capture command, a visual token to be included in one or more images to be captured by the camera. The instructions are further executable by the at least one processor to locate the visual token within an image preview output by the computing device while operating in the image capture mode. The instructions are further executable by the at least one processor to capture one or more images of the visual token.

In another example, the disclosure is directed to a non-transitory computer-readable storage medium storing instructions that, when executed, cause at least one processor of a computing device to, while the computing device is operating in an image capture mode, receive an indication of a natural language user input associated with an image capture command. The instructions further cause the at least one processor of the computing device to determine based on the image capture command, a visual token to be included in one or more images to be captured by a camera of the computing device. The instructions further cause the at least one processor of the computing device to locate the visual token within an image preview output by the computing device while operating in the image capture mode. The instructions further cause the at least one processor of the computing device to capture one or more images of the visual token.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
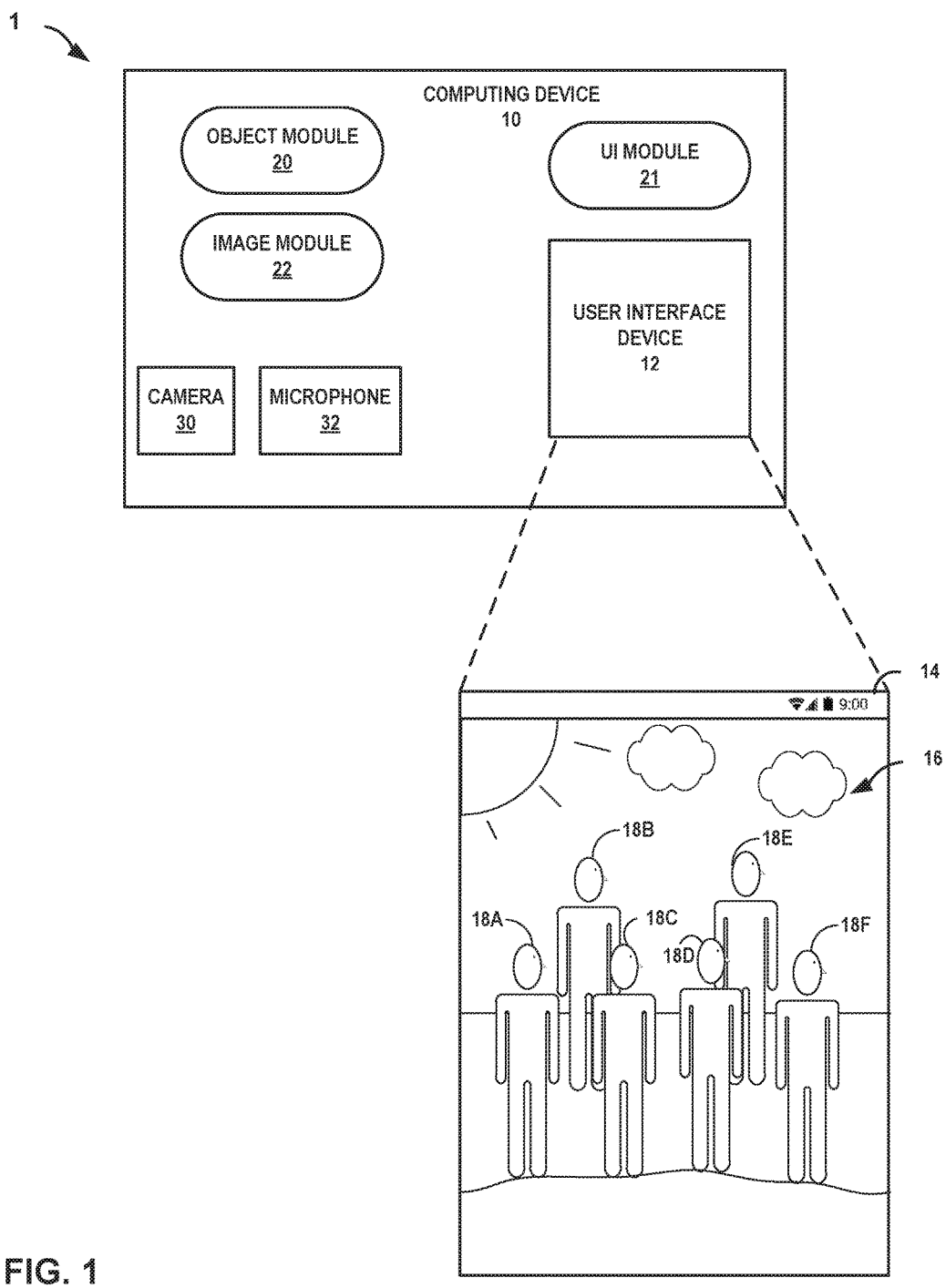
FIG. 1 is a conceptual diagram illustrating an example computing system with an example computing device configured to receive an indication of a natural language user input associated with an image capture command and execute the image capture command, in accordance with one or more aspects of the present disclosure.

In general, techniques of this disclosure may enable a computing device to interpret natural language user inputs for precisely controlling a camera of the computing device to take pictures or videos of specific visual tokens of real-world objects, actions, persons, locations, concepts, or scenes. For example, a computing device that includes a camera may receive an indication of a natural language user input associated with an image capture command. For instance, a microphone of the computing device may receive an audio input as the user speaks the phrase "take a picture of the girl in the yellow dress jumping up and down."

The computing device may analyze the natural language input and determine, an image capture command and one or more visual tokens to be included in one or more images to be captured by the camera. For example, using natural language processing techniques on the audio input received by the microphone, the computing device may recognize the phrase "take a picture" as an image capture command and the phrase "girl in the yellow dress jumping up and down" as the visual token.

The computing device may locate the visual token within an image preview being output for display by the computing device (e.g., as part of a viewfinder of a graphical user interface). For example, using image processing techniques, the computing device may identify a portion of the image preview that corresponds to the shape and color of a girl in a yellow dress. The computing device may automatically execute the image capture command indicated by the natural language input to capture one or more images of the object specified by the natural language input. For example, the computing device may adjusts the camera controls to focus, crop, or otherwise enhance the image preview so that the camera takes a picture that is fixated on the girl in the yellow dress.

In this way, rather than requiring user inputs at a presence-sensitive input device to control a camera of a device, the techniques of this disclosure may enable a computing device to take pictures, video, or otherwise control a camera using natural language user inputs. The computing device may execute complex operations in capturing one or more images of a visual token based purely on voice inputs and without requiring the user to touch a screen or a button of the computing device. The computing device may receive the natural language user input orally, allowing the user to devote their full attention to stabilizing the computing device while the computing device processes the image capture command and performs the functions associated with the image capture command.

Throughout the disclosure, examples are described where a computing device and/or a computing system may analyze information (e.g., voice inputs from a user) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user. Thus, the user may have control over how information is collected about the user and used by the computing device.

FIG. 1 is a conceptual diagram illustrating an example computing system 1 with an example computing device 10 configured to receive an indication of a natural language user input associated with an image capture command and execute the image capture command, in accordance with one or more aspects of the present disclosure. Computing system 1 of FIG. 1 is an example computing system that includes computing device 10. Computing system 1, in other examples, may also include other external devices, such as a server device, a network, or other camera devices.

In the example of FIG. 1, computing device 10 is a mobile computing device (e.g., a mobile phone). However, computing device 10 may be any type of mobile or non-mobile computing device such as a tablet computer, a personal digital assistant (PDA), a desktop computer, a laptop computer, a gaming system, a media player, an e-book reader, a television platform, an automobile navigation system, or a wearable computing device (e.g., a computerized watch, computerized eyewear, a computerized glove).

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function. In accordance with the techniques of this disclosure, user interface (UI) module 21 of computing device 10 may utilize UID 12 to show image preview 16 when computing device 10 is operating in an image capture mode.

Computing device 10 may be configured to operate in different modes, or device states. In some examples, the mode in which computing device 10 is operating may be dependent on an application being executed by one or more modules of computing device 10. In general, as referred to in this disclosure, an "image capture mode" may be considered any mode or state in which a computing device, such as computing device 10, enters after receiving an initial indication of user input to utilize a camera, such as camera 30, but prior to the camera actually being utilized to capture an image, take a photo, take a video, or otherwise generate and store data that represents one or more captured images. For instance, when computing device 10 is operating in the image capture mode, one or more modules of computing device 10 may be executing a camera application or otherwise providing an interface where a user may interact with camera 30 utilizing computing device 10. However, while operating in image capture more, camera 30 of computing device 10 may not yet have performed an operation to capture an image that is stored as a captured image or video. An image capture mode is in contrast and different than a "post capture mode", such as an "image evaluation mode". As referred to in this disclosure, a "post capture mode" represents any mode in which a computing device, such as computing device 10, enters immediately after performing an operation to capture an image that is stored as a captured image or video. For example, computing device 10 may, while operating in a post capture mode, output for display the captured image taken by camera 30 for post processing, user evaluation, user confirmation, or user initiated deletion, among other things. In some examples, computing device 10 receives a subsequent indication of user input indicating that the user would like to take another picture, computing device 10 may exit the post capture mode and return to operating in the image capture mode.

Computing device 10 may include various input devices. For instance, computing device 10 may include camera 30. Camera 30 may be an optical instrument for recording or capturing images. Camera 30 may capture individual still photographs or sequences of images constituting videos or movies. Camera 30 may be a physical component of computing device 10. Camera 30 may include a camera application that acts as an interface between a user of computing device 10 and the functionality of camera 30. Camera 30 may perform various functions, such as capturing one or more images, focusing on one or more objects, and utilizing various flash settings, among other things.

Computing device 10 may include microphone 32. Microphone 32 may be a transducer that converts sound into an electrical signal to be processed by one or more modules of computing device 10. Microphone 32 may use electromagnetic induction (dynamic microphones), capacitance change (condenser microphones) or piezoelectricity (piezoelectric microphones) to produce the electrical signal from air pressure variations. Microphone 32 may output the electrical signal in analog or digital form. For example, microphone 32 may output the electrical signal as an analog output and/or may output the electrical signal in digital form, such as a message, a sequence of bits, or other digital output. Object module 20 may receive the output from microphone 32 and process the output to determine spoken input received by microphone 32.

Computing device 10 may include object module 20 and image module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at a network in a network cloud.

In general, object module 20 may perform various techniques of this disclosure associated with natural language command processing and object location. For instance, object module 20 may receive indications of user input to computing device 10, such as the spoken inputs received by microphone 32. Object module 20 may further interpret the indications of user input to determine a function to be performed in response to the receipt of the indications of user input. Object module 20 may locate and determine various visual tokens with an image preview of an image to be captured by camera 30 or an image that camera 30 has already captured based on referential visual tokens stored by computing device 10. In other words, a referential visual token may be data stored in computing device 10 that describes one or more characteristics of visual tokens that computing device 10 may detect within the image preview.

In general, image module 22 may perform various techniques of this disclosure associated with capturing images and executing image capture commands that interpreted from user inputs being processed by object module 20. For instance, image module 22 may utilize camera 30 to capture one or more images of the object located by object module 20. Image module 22 may further perform aspects of the image capture command, such as focusing camera 30 on a visual token, cropping an image around a visual token, zooming camera 30 to a visual token, or capturing one or more images of the visual token using camera 30 while the object is performing a particular action. In other words, image module 22 may perform actions directly associated with the use of camera 30.

In accordance with the techniques of this disclosure, computing device 10 may perform various functions while operating in the image capture mode. When computing device 10 is operating in the image capture mode, one or more modules of computing device 10 may be executing a camera application or otherwise providing an interface where a user may interact with camera 30 utilizing computing device 10. In other instances, computing device 10 may be operating in the image capture mode whenever computing device 10 is able to receive indications of user input to readily capture one or more images. While in the image capture mode, UI module 21 of computing device 10 may output graphical user interface 14 that includes image preview 16. Image preview 16 may include a digital representation of what would be included in a captured image if camera 30 were to immediately capture an image. As a user of computing device 10 moves camera 30, UI module 21 may update image preview 16 to show the new digital representation of what would be included in the captured image if camera 30 were to immediately capture in image after moving. In the example of FIG. 1, image preview 16 includes subjects 18A-18F (collectively, subjects 18).

While operating in the image capture mode, object module 20 may receive an indication of a natural language user input associated with an image capture command. For instance, in the example of FIG. 1, a user of computing device 10 may speak a natural language user input into microphone 32, where the natural language user input includes the image capture command. Microphone 32 may convert the natural language user input into some form of output, such as an electrical signal, a message, or a sequence of bits. Object module 20 may receive the output as the indication of the natural language user input. Object module 20 may analyze the output to determine the image capture command. In the example of FIG. 1, the image capture command may be an instruction to take a picture of the leftmost subject of subjects 18 (i.e., subject 18A).

Object module 20 may determine, based on the image capture command, a visual token to be included in one or more images to be captured by camera 30 of computing device 10. For instance, object module 20 may parse the natural language user input into two or more distinct portions: a specific image capture command, as well as a particular visual token or multiple visual tokens that will be the subject of one or more images captured by camera 30 using the specific image capture command. In accordance with the techniques of this disclosure, a visual token may be any object, person, action, location, or concept (e.g., "wildlife," "wedding," "kiss," "military," or "love"). In the example of FIG. 1, the visual token included in the natural language user input is subject 18A. As such, object module 20 may determine that the visual token that will be the subject of one or more images captured by camera 30 using the specific image capture command is the leftmost subject of subjects 18 (i.e., subject 18A).

Object module 20 may locate the visual token within image preview 16 output by UID 12 of computing device 10 while operating in the image capture mode. As stated above, object module 20 may determine that subject 18A is the visual token to be captured in one or more images by camera 30. Object module 20 may scan image preview 16 to locate subjects 18 and determine the leftmost subject of subjects 18 (i.e., subject 18A). More detailed examples of various ways object module 20 may locate the visual token within image preview 16 are described below with respect to FIG. 2.

Using the visual token location and the image capture command determined by object module 20, image module 22 may capture one or more images of the visual token. For instance, image module 22 may receive, from object module 20, the image capture command and the location of subject 18A. Image module 22 may utilize camera 30 to execute the image capture command and capture one or more images of subject 18A. In some examples, image module 22 may use camera 30 to capture one or more images of subject 18A once subject 18A is fully located within image preview 16. In some other examples, image module 22 may focus camera 30 on subject 18A and keep the zoom level of camera 30 consistent. In some instances of such examples, image module 22 may crop the captured image to provide an illusion of zooming camera 30 in on subject 18A. In still other examples, image module 22 may zoom camera 30 onto subject 18A such that subject 18A is the center of the captured image.

Rather than requiring a user to input multiple touch indications on computing device 10 in order to take a picture, by performing an image capture command based on a natural language user input, computing device 10 may execute complex operations in capturing one or more images of a visual token without requiring the user to touch UID 12 or a button of computing device 10. Computing device 10 may receive the natural language user input orally, such as via microphone 32, allowing the user to devote their full attention to stabilizing camera 30 while computing device 10 processes the image capture command and performs the functions associated with the image capture command. Further, by requiring fewer indications of touch inputs (e.g., multiple touches to adjust focus, zoom, flash settings, and to take the picture), computing device 10 may perform fewer operations in response thereto, thereby consuming less electrical power.

The techniques described herein may further have benefits for people who are physically impaired. For example, if a user has a physical impairment that limits the use of their arms or hands, a computing device that receives indications of natural language user inputs to capture images and perform complex image capture commands may allow such a user to still take pictures without the use of their hands. Users with various physical impairments may find it difficult to operate computing devices that require touch inputs or other manual inputs while also holding the computing device. As such, computing device 10 may provide valuable assistance to such users with various physical impairments.

Figure 2:
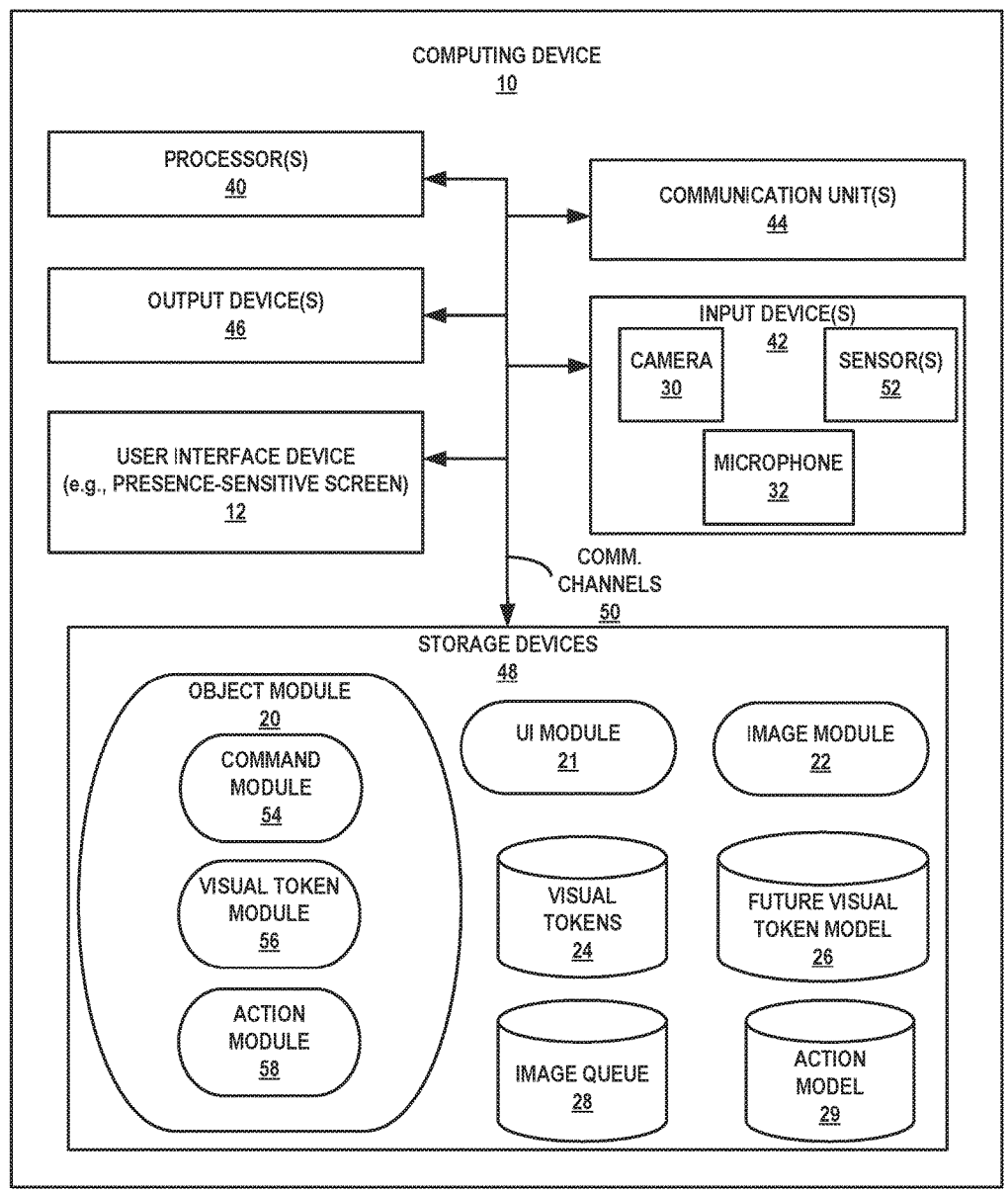
FIG. 2 is a block diagram illustrating an example computing device configured to receive an indication of a natural language user input associated with an image capture command and execute the image capture command, in accordance with one or more aspects of the present disclosure.

FIG. 2 is a block diagram illustrating an example computing device 10 configured to receive an indication of a natural language user input associated with an image capture command and execute the image capture command, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Input devices 42 include camera 30, microphone 32, and one or more sensors 52. Storage devices 48 of computing device 10 also include object module 20, UI module 21, image module 22, visual tokens 24, future visual token model 26, image queue 28, and action model 29. Output module 20 may further include command module 54, visual token module 56, and action module 58. Object module 20, UI module 21, and image module 22 may rely on information stored as visual tokens 24, future visual token model 26, image queue 28, and action model 29 at storage device 48. In other words, as is described in more detail below, object module 20, UI module 21, and image module 22 may be operable by processors 40 to perform read/write operations on information, stored as visual tokens 24, future visual token model 26, image queue 28, and action model 29, at storage device 48. Object module 20, UI module 21, and image module 22 may access the information stored in visual tokens 24, future visual token model 26, image queue 28, and action model 29 to perform a function of computing device 10.

Communication channels 50 may interconnect each of the components 12, 20.21, 22, 24, 26, 28, 29, 30, 32, 40, 42, 44, 46, 48, 52, 54, 56, and 58 for inter-component communications (physically, communicatively, and/or operatively). In some examples, communication channels 50 may include a system bus, a network connection, an inter-process communication data structure, or any other method for communicating data.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more input devices 42 of computing device 10 may receive input. Examples of input are tactile, audio, and video input. Input devices 42 of computing device 10, in some examples, includes a presence-sensitive display, touch-sensitive screen, mouse, keyboard, voice responsive system, video camera, microphone, sensor, or any other type of device for detecting input from a human or machine.

Camera 30 of input devices 42 may be similar and include some or all of the same features as camera 30 of FIG. 1. Camera 30 may be an optical instrument for recording or capturing images. Camera 30 may capture individual still photographs or sequences of images that make up videos or movies. Camera 30 may be a physical component of computing device 10. Camera 30 may include a camera application that acts as an interface between a user of computing device 10 and the functionality of camera 30. Camera 30 may perform various functions, such as capturing one or more images, focusing on one or more visual tokens, and utilizing various flash settings, among other things. In some examples, camera 30 may be a single camera. In other examples, camera 30 may include multiple cameras.

Microphone 32 of input devices 42 may be similar and include some or all of the same features as microphone 32 of FIG. 1. Microphone 32 may be a transducer that converts sound into an electrical signal to be processed by one or more modules of computing device 10. Microphone 32 may use electromagnetic induction (dynamic microphones), capacitance change (condenser microphones) or piezoelectricity (piezoelectric microphones) to produce the electrical signal from air pressure variations. Microphone 32 may produce other output based on the received audio input, such as a message or a sequence of bits. Object module 20 may receive the output from microphone 32 and process the output to determine spoken input received by microphone 32. In some examples, microphone 32 may be a single microphone. In other examples, microphone 32 may include multiple microphones.

Sensors 52 may include one or more other input devices of input devices 42 that record changes in the environment around computing device 10 and convert the changes to data. Examples of sensors 52 may include an accelerometer that generates accelerometer data. Accelerometer data may indicate an acceleration and/or a change in acceleration of computing device 10. Sensors 52 may include a gyrometer that generates gyrometer data. Gyrometer data may indicate a physical orientation and/or change in physical orientation of computing device 10. In some examples, the orientation may be relative to one or more reference points. Sensors 52 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 52 may include a barometer for sensing barometric pressure associated with computing device 10. Computing device 10 may infer a change in elevation or detect movement based on the barometric pressure data obtained by a barometer of sensors 52.

Additional examples of sensors 52 may include an ambient light sensor that generates ambient light data. The ambient light data may indicate an intensity of light to which computing device 10 is exposed. Sensors 52 may include a proximity sensor that generates proximity data. Proximity data may indicate whether an object is within proximity to computing device 10. In some examples, proximity data may indicate how close an object is to computing device 10. In some examples, sensors 52 may include a clock that generates a date and time. The date and time may be a current date and time. Sensors 52 may include a pressure sensor that generates pressure data. Pressure data may indicate whether a force is applied to computing device 10 and/or a magnitude of a force applied to computing device 10. Pressure data may indicate whether a force is applied to UID 12 and/or a magnitude of a force applied to UID 12. Sensors 52 may include a global positioning system that generates location data.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

UID 12 is similar to UID 12 of FIG. 1 and may include some or all of the same features as UID 12 of FIG. 1. In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., visual tokens 24, future visual token model 26, image queue 28, and action model 29) that modules 20 (including modules 54, 56, and 58), 21, and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 (including modules 54, 56, and 58), 21, and 22, visual tokens 24, future visual token model 26, image queue 28, and action model 29.

One or more processors 40 may implement functionality and/or execute instructions within computing device 10. For example, processors 40 on computing device 10 may receive and execute instructions stored by storage devices 48 that execute the functionality of object module 20 (including the functionality of modules 54, 56, and 58), UI module 21, and image module 22. These instructions executed by processors 40 may cause computing device 10 to process and execute image commands for computing device 10 based on visual tokens 24, future visual token model 26, image queue 28, and action model 29, within storage devices 48 during program execution. Processors 40 may execute instructions of modules 20 (including modules 54, 56, and 58), 21, and 22 to cause to perform various actions or functions of computing device 10.

Visual tokens 24 represents any suitable storage medium for storing different visual tokens discovered in an image preview displayed on UID 12. In accordance with the techniques of this disclosure, a visual token may be associated with any on of an object, a person, an action, a location, or a concept, as well as spatial relationships between objects, people, locations, or any combination thereof. In accordance with the techniques of this disclosure, visual token data may include any information usable by object module 20 to identify visual tokens within an image preview, such as visual token shape information, visual token color information, visual token size information, visual token orientation information, visual token environment information, visual token motion information, sample images of the visual token, sample images of exemplary portions of the visual token, or any other identifying information of an associated visual token that object module 20 may use to identify the associated visual token in an image preview. For instance, visual tokens 24 may be a short-term data structure for organizing visual token data as received by object module 20 based on the image preview captured by camera 30. Object module 20 may access visual tokens 24 to determine any current visual tokens representing visual tokens in the image preview on computing device 10. Object module 20 may perform read/write operations for adding identifying information to visual tokens 24 or editing identifying information in visual tokens 24 (e.g., when camera 30 shifts and/or when new visual tokens are being displayed in the image preview).

Future visual token model 26 represents any suitable storage medium for storing a model that may be utilized by computing device 10 to determine expected visual tokens in an image preview based on the current visual tokens determined in visual tokens 24. For instance, future visual token model 26 may be a long-term data structure for organizing visual token data as received by object module 20 based on the image preview captured by camera 30. Visual token model 26 may associate different visual tokens with one another and object module 20 may predict, based on the associations between visual tokens, the future presence of visual tokens based on current visual tokens 24. Object module 20 may access future visual token model 26 to determine expected visual tokens based on current visual tokens representing visual tokens in the image preview on computing device 10. Object module 20 may perform read/write operations for adding information to future visual token model 26 (e.g., when object module 20 determines new parings of visual tokens in the image preview) or editing information from future visual token model 26 (e.g., when object module 20 changes associations between visual tokens within future visual token model 26).

In some instances, future visual token model 26 may describe one or more relationships between one or more subsets of visual tokens 24, potentially based at least in part on a hidden Markov model. For instance, if object module 20 determines that two or more visual tokens are present in an image preview, object module 20 may access data within future visual token model 26 to determine a relationship between the two or more visual tokens. From this relationship, object module 20 may determine a scene or a location of the image preview. For instance, if object module 20 determines that both a scoreboard and a fence are present in an image preview, object module 20 may access future visual token model 26 to determine a relationship between the scoreboard and the fence. Visual token model 26 may indicate that both visual tokens may be present at a baseball field. Visual token model 26 may also indicate that baseball equipment and baseball players are also generally present at baseball fields. As such, object module 20 may determine that an expected future visual token is baseball equipment or a baseball player.

Image queue 28 represents any suitable storage medium for storing one or more different images captured by camera 30. For instance, image queue 28 may be a short-term data structure for organizing one or more images as received by image module 22 based on images captured by camera 30. Image module 22 may access image queue 28 to store one or more images captured by camera 30. Object module 20, including action module 58, may further perform read/write operations for editing information from image queue 28 (e.g., object module 20 is analyzing the one or more images in image queue 28 to determine when a visual token in the one or more images is performing a specific action).

Action model 29 represents any suitable storage medium for storing a model that may be utilized by computing device 10 to determine whether an object within one or more images is performing a particular action as defined by the visual token. For instance, action model 29 may be a long-term data structure for organizing action data as determined by object module 20 based on past images captured by camera 30 and associating different configurations of objects within the images to particular actions. Examples of action data include any information describing motions of various visual tokens, such as visual token shape configurations before, during, and after a motion, speed of motion information, sample images of visual tokens performing the specific action, visual token orientation shifts, or visual token environment changes, among other things. Object module 20 may access action model 26 to determine any actions being taken by particular objects within one or more visual tokens in the one or more images of image queue 28 in computing device 10. Object module 20 may perform read/write operations for adding information to action model 29 (e.g., when object module 20 determines new actions performed by various objects/visual tokens) or editing information from action model 29 (e.g., when object module 20 updates how various objects/visual tokens within images captured by camera 30 appear when performing various actions based on user feedback).

Storage device 48 may include object module 20, UI module 21, and image module 22. Object module 20, UI module 21, and image module 22 may be additional examples of modules 20, 21, and 22 from FIG. 1, including similar and some or all the same functionality of modules 20, 21, and 22 from FIG. 1

In accordance with the techniques of this disclosure, computing device 10 may perform various functions for controlling camera 30 while computing device 10 is operating in image capture mode. While operating in the image capture mode, object module 20 may utilize command module 54 to receive and process natural language user inputs. That is, command module 54 may receive an indication of a natural language user input associated with an image capture command.

For instance, a user of computing device 10 may speak a natural language user input that is detected by microphone 32, where the natural language user input includes the image capture command specifying a visual token including at least an object and an action. Microphone 32 may convert the natural language user input into an output, such as a message, a sequence of bits, or an electrical signal, and command module 54 may receive the output from microphone 32 over communication channels 50 as the indication of the natural language user input.

Command module 54 may analyze the output from microphone 32 to determine the image capture command stated by the user when the user provides the natural language user input. In the example of FIG. 2, the image capture command may be an instruction to capture an image of a visual token including a particular object (e.g., a dog) while the particular object is performing a particular action (e.g., catching a ball). In other instances, the image capture command may be an instruction to crop one or more images to fit around the visual token of the particular object or to focus camera 30 on the particular object and capture one or more images focused on the particular object.

Command module 54 may determine, based on the image capture command, a visual token to be included in one or more images to be captured by camera 30 of computing device 10. For instance, command module 54 may parse the natural language user input into two or more distinct portions: one or more portions of the natural language input that include a specific image capture command, as well as one or more portions of the natural language input that include a particular visual token or multiple visual tokens that will be the subject of one or more images captured by camera 30 using the specific image capture command. In the example of FIG. 2, the visual token included in the natural language user input is the dog object. As such, command module 54 may determine that the object that will be the subject of one or more images captured by camera 30 using the specific image capture command is a dog located within an image preview.

For instance, in parsing the natural language user input, command module 54 may determine if the received input includes portions of audio indicative of human speech. Using speech recognition techniques, command module 54 may transcribe received natural language user input into one or more words of spoken language. Command module 54 may utilize data containing various speech characteristics during the transcribing process to compensate for variances in the speech of different users. These characteristics may include tone, accent, rhythm, flow, articulation, pitch, resonance, or other characteristics of speech that the device has learned about the user from previous natural language inputs from the user. Taking into considerations known characteristics about the user's speech, command module 54 may improve results in transcribing the natural language user input for that user.

Visual token module 56 may locate the visual token determined from a natural language input within an image preview output by UI module 21 via UID 12 of computing device 10 while operating in the image capture mode. As stated above, command module 54 may determine that a dog is the visual token to be captured in one or more images by camera 30. Visual token module 56 may scan an image preview to locate and determine a dog within the image preview.

In some instances, in locating the visual token, visual token module 56 may determine one or more referential visual tokens associated with a respective visual token of one or more visual tokens within the image preview. In accordance with the techniques described herein, a referential visual token may be data stored in computing device 10 that describes one or more characteristics of visual tokens that computing device 10 may detect within the image preview. Visual token module 56 may store such referential visual tokens in visual tokens 24. Visual token module 56 may then match the natural language user input with a first referential visual token of the one or more referential visual tokens 24 and determine the visual token associated with the first referential visual token is the visual token to be included in the one or more images to be captured. For instance, in the image preview, visual token module 56 may recognize the dog, grass, a bush, and a tree. Visual token module 56 may determine respective referential visual tokens identifying each of the four recognized visual tokens. Visual token module 56 may match the determined visual tokens with the visual token identified from the image capture command (i.e., the dog) and determine that the visual token that matches the dog is the visual token to be captured in the one or more images.

In some instances, the one or more visual tokens determined by visual token module 56 may be current visual tokens. In such instances, using future visual token model 26, visual token module 56 may determine one or more expected future visual tokens. As described above, future visual token model 26 may describe relationships between one or more subsets of visual tokens. Based on the current visual tokens 24 and the relationships within future visual token model 26, visual token module 56 may determine one or more expected future visual tokens. For instance, based on the current visual tokens of the dog and the grass, visual token module 56 may determine that the scene may be a park, and that a visual token of a ball is expected in a future image preview.

In some examples, visual token module 56 may update future visual token model 26 based on various information. For instance, visual token module 56 may determine one or more actual future visual tokens associated with a respective visual token of the one or more visual tokens in a second image preview generated after the original image preview. Visual token module 56 may compare the one or more actual future visual tokens with the one or more expected future visual tokens previously determined. Visual token module 56 may then update future visual token model 26 based on this comparison. For instance, in the example of FIG. 2, visual token module 56 determined a ball to be an expected future visual token. If visual token module 56 analyzes a second image preview and determines that a ball is now present within the second image preview, visual token module 56 may update future visual token model 26 by increasing the future likelihood of determining a ball to be present when a dog and grass is present, confirming the previous prediction. If, however, visual token module 56 analyzes the second image preview and determines that a rope toy is now present within the second image preview, visual token module 56 may update future visual token model 26 by decreasing the future likelihood of determining a ball to be present when a dog and grass is present and increasing the future likelihood of determining a rope toy to be present when a dog and grass is present.

In other instances, visual token module 56 may update future visual token model 26 based on crowdsourced visual token data. For instance, visual token module 56 may receive crowdsourced visual token data that includes a set of one or more expected future visual tokens associated with the one or more current visual tokens for one or more crowdsourced computing devices different than computing device 10. The crowdsourced data may be based on users with similar interests as a user of computing device 10. For instance, the user of computing device 10 may belong to a social media group for dog lovers. Given visual token module 56's attempts to determine expected future visual tokens based on the current visual token of a dog, visual token module 56 may receive crowdsourced visual token data from computing devices associated with users of the same social media group for expected visual tokens when such users are taking pictures of dogs and grass together. Visual token module 56 may update future visual token model 26 based on this crowdsourced visual token data from users with similar interests as the user, as it is expected that users with similar interests may encounter similar visual tokens in their captured images.

Visual token module 56 may utilize future visual token model 26 to analyze future images for current visual tokens. By consistently updating future visual token model 26, visual token module 56 may more efficiently analyze images and actions within the images during the execution of the techniques described herein. Future visual token model 26 may provide a basis on top of which computing device 10 may categorize or "build a narrative of" captured images or videos for an event when receiving future image capture commands based on categories.

Rather than manually placing object labels across video frames, computing device 10 may analyze certain tokens common throughout multiple images to contextualize and successfully predict the occurrence of the various tokens in future image previews. In contextualizing and predicting the various tokens, computing device 10 may improve recognition in a more precise way than tracking-based temporal smearing.

As such, computing device 10 may identify a small set of contextual categories in future visual token model 26 that cover a large fraction of potential images, as well as a vocabulary of visual tokens associated with objects within individual images. In some examples, computing device 10 may make these identifications personal to a user based on common user contexts. As such, computing device 10 may find clusters of images and determine the vocabulary of visual tokens in the clusters of images.

For instance, future visual token model 26 may include categories for a wedding, a grill party, a graduation, a baptism, camping, sport games, a festival, an air show, a concert, and a cruise trip. For some of these categories, future visual token model 26 may include typical predicted visual tokens, e.g. in a wedding, visual tokens may include a formal ceremony followed by a party, where the formal ceremony consists of the main actors walking in, then a mix of songs and/or speeches, then wedding rings being brought in and placed on a bride and a groom, a kiss, and finally the main actors leaving. However, other categories in future visual token model 26 may be more loosely structured, and certain visual tokens within such categories may provide more insight than others as to what is likely to come. For instance, if the category in future visual token model 26 is a camping trip and there is an image with a sunset, future visual token model 26 may indicate that a visual token of fire or a grill may be present in a future image.

With context-specific token prediction in future visual token model 26, computing device 10 may be configured to utilize dynamic programming, where each new captured image seen in a user stream may be labeled as a continuation of an instance of an event belonging to a particular category in future visual token model 26, a distractor from future visual token model 26 (e.g., an image that does not fit in the current category), the start of a new event in the same or a different category, or the start of a new episode of an event in the current category that had been previously interrupted. Computing device 10 may assign each one of these label assignments a cost that depends on the topical specificity of the item (e.g., how common the item is within images for the particular category) and spatio-temporal gaps to neighbor images (e.g., an amount of time that passes between images captured). Alternatively, computing device 10 may train a distance metric that would measure how likely any two images are to belong to a single event in the same category in future visual token model 26 (e.g., based on factors like temporal, geographical and semantic distance). Computing device 10 may train future visual token model 26 using a clustering algorithm to grow clusters by combining such distance with the narrative fitness to measure the cost of adding each candidate item to an existing cluster.

The techniques described herein may enable both the specialization of these existing constraints for each relevant contextual category, as well as the addition of a narrative completeness of the selected subset. Computing device 10 may not exclude content from an event for a particular category just because the content does not fit a typical instance of the particular category, as surprising elements may be the motivation for capturing the image. However, computing device 10 may train future visual token model 26 such that certain key narrative elements that are normally present to tell a certain kind of story. For instance, computing device 10 may compare two options for generating future visual token model 26: one that includes only visual tokens A and C and another that includes A, B and C. If computing device 10 trains future visual token model 26 to predict that the likelihood of A and C is smaller than A, B, and C, then computing device 10 may institute a penalty for leaving B out. To handle this properly, computing device 10 may separate the tokens that are central for the entire contextual category in future visual token model 26 from those that are central for a given user story relative to its contextual category in future visual token model 26.

Using the techniques described herein, computing device 10 may further improve capture time. Future visual token model 26 may model what elements are central narrative elements in a given scene, so that computing device 10 may focus on the location of important visual tokens. Such selections may be biased toward image previews where the key narrative elements are well represented.

Using the visual token location and the image capture command determined by command module 54, image module 22 may capture one or more images of the visual token. For instance, image module 22 may receive, from object module 20, the image capture command and the location of the dog within the image preview. Image module 22 may utilize camera 30 to execute the image capture command and capture one or more images of the dog. In some examples, image module 22 may use camera 30 to capture one or more images of the dog once the dog is fully located within the image preview. In some other examples, image module 22 may focus camera 30 on the dog and keep the zoom level of camera 30 consistent. In some instances of such examples, image module 22 may crop the captured image to provide an illusion of zooming camera 30 in on the dog. In still other examples, image module 22 may zoom camera 30 onto the dog such that the dog is the center of the captured image.

In the example of FIG. 2, the image capture command includes capturing one or more images of a visual token that includes a particular object (i.e., the dog) performing a particular action (i.e., catching the ball). In such instances, to execute the image capture command, image module 22 may monitor the particular object within the image preview. Once action module 58 determines that the particular object in the image preview is beginning to perform the particular action, image module 22 may use camera 30 to capture the one or more images of the object as shown in the image preview and store the one or more images of the object in image queue 28. Image module 22 may continue to capture the one or more images until action module 58 determines that the particular object in the image preview has completed performing the particular action. Action module 58 may then analyze each of the one or more images in image queue 28 to determine a status, or an indication of the progress of the particular object in performing the action, of the object within each of the one or more images. Action module 58 may select a particular image of the one or more images in response to determining, based on action model 29, that a status of the object in the particular image more closely matches the particular object being in the middle of performing particular action.

For instance, in the example of FIG. 2, where the image capture command includes instructions for capturing an image of the dog catching the ball, action module 58 may analyze each image of the series of images to determine a status of the dog. For instance, action module 58 may determine the dog is sitting, the dog is jumping, the dog has its mouth open or closed, or some other status of the dog. Action module 58 may determine if a visual token associated with the ball is present any of the one or more images and how close the ball is to the dog's mouth in each of the one or more images in which the ball is present. Action model 29 may include data associated indicating requirements for a portion of an image to indicate the action of catching the ball, such as requiring: the ball and the dog to both be present in the image, the ball should be in the dog's mouth, or any other information that could indicate the dog catching the ball. Image module 22 may then capture a series of images of the dog once the dog begins to jump in the air or once the ball is present in the image preview and stop capturing images when the dog lands back on the ground with the ball in its mouth. Based on the data associated with the action of catching the ball included in action model 29, action module 58 may select the particular image of the one or more images where the status of the dog more closely matches the requirements of action model 29. For instance, action module 58 may select the image where the status of the dog indicates the dog is jumping in the air and the status of the ball indicates the ball is located in the dog's mouth.

Action module 58 may update action model 29 based on user feedback. For instance, UI module 21 may cause UID 12 to present the first image selected by action module 58 and also output a prompt for obtaining an indication of user input to either confirm the particular image or decline the particular image. If action module 58 receives an indication of user input confirming the particular image, action module 58 may store the particular image to memory and update action model 29 to reinforce the analysis and determinations of the dog performing the specific act of catching the ball. If, however, action module 58 receives an indication of user input declining the first image, action module 58 may update action model 29 to decrease the associations between the dog and the ball as currently defined. Action module 58 may select one or more additional images of the dog in the process of catching the ball and utilize UI module 21 to cause UID 12 to present the one or more additional images. Action module 58 may receive an additional indication of user input selecting a second image of the one or more additional images and update action model 29 based on the updated selection.

In some instances, the image capture command may include capturing a series of images for the visual token. In such instances, image module 22 may utilize camera 30 to capture a plurality of images for the visual token. UI module 21 may then cause UID 12 to display the images. Command module 54 may then receive an additional command to focus on the images of the plurality of images that show the visual token of the object performing a particular action. As such, techniques of this disclosure further enable computing device 10 to process the one or more images after the one or more images have been captured to select images of the visual token of an object performing a particular action in a manner similar to the techniques described above.

After capturing the images, computing device 10 may utilize future visual token model 26 to organize previously captured images by suggesting possibly-discontinuous subsets of the images that belong to the same category within future visual token model 26 as albums, possibly by segmenting the captured images into pages that correspond to smaller narrative units using future visual token model 26. Computing device 10 may also build an ontology of scenes, objects and actions that users capture with camera 30 using future visual token model 26, in a way that computing device 10 may compute probabilities of the occurrence of each visual token, action, or N-gram in each one of certain contexts in future visual token model 26.

Similarly, computing device 10 may enable deeper personalization. If the user wants to focus on a particular subject, it may be likely that the particular subject is important and may appear in other images captured in the past. Computing device 10 may analyze the space of possible appearances of the particular subject with respect to future visual token model 26 which parts of such space are preferred by the user. That may be used, for instance, to make the final saved image less blurry and a higher quality.

Throughout the disclosure, examples are described where a computing device and/or a computing system may analyze information (e.g., voice inputs from a user) associated with a computing device only if the computing device receives permission from the user to analyze the information. For example, in situations discussed above in which the computing device may collect or may make use of information associated with the user, including voice inputs or location information indicated by image data, the user may be provided with an opportunity to provide input to control whether programs or features of the computing device can collect and make use of user information or to dictate whether and/or how to the computing device may receive content that may be relevant to the user. In addition, certain data may be treated in one or more ways before it is stored or used by the computing device and/or computing system, so that personally-identifiable information is removed. For example, stored image data may be treated so that no personally identifiable information can be determined about the user. Thus, the user may have control over how information is collected about the user and used by the computing device.

Figure 3:
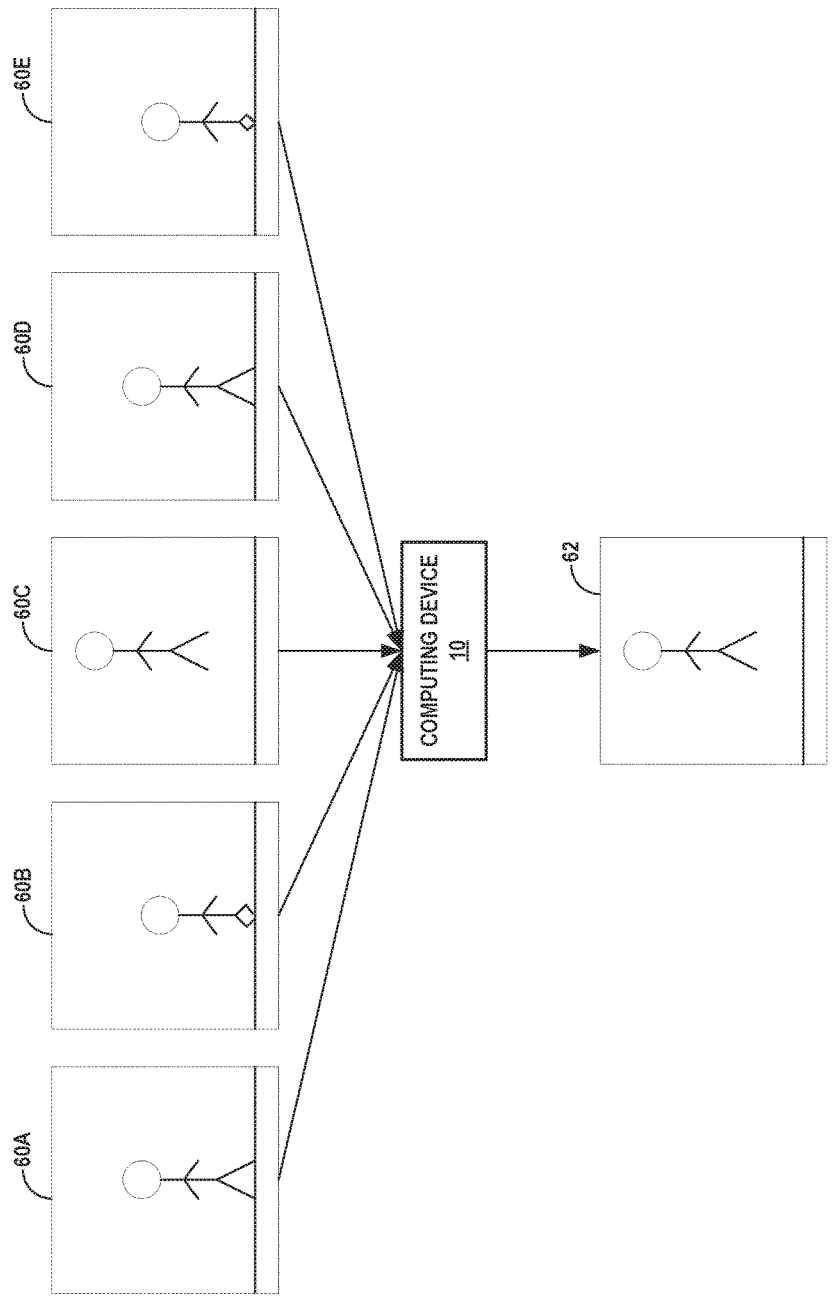
FIG. 3 is a conceptual diagram illustrating an example image capture command executable by a computing device, in accordance with one or more aspects of the present disclosure.

FIG. 3 is a conceptual diagram illustrating an example image capture command executable by a computing device, in accordance with one or more aspects of the present disclosure. The operations of computing device 10 are described within the context of system 1 of FIG. 1 and computing device 10 of FIG. 2. The conceptual diagram of FIG. 3 include example image previews 60A-60E which are meant to show a sequence of images previewed by camera 30 of computing device 10 in response to an image capture command received by computing device 10.

For instance, in the example of FIG. 3, the image capture command may include capturing an image of a visual token including a human jumping. In such an example, computing device 10 may preview images 60A-60E in temporal order, with image 60A being previewed first and image 60E being previewed last. Computing device 10 may analyze each image preview of image previews 60A-60E to determine a status of the human within the image. For instance, computing device 10 may determine that the human in image preview 60A is standing in a stationary position. Computing device 10 may determine that the human in image preview 60B is crouching in preparation of a jump. At this point, once computing device 10 determines that the visual token in image preview 60B is beginning to perform the action specified in the image capture command, computing device 10 may begin capturing one or more images of the visual token. Computing device 10 may determine that the human in image preview 60C is midair in the process of a jump. Computing device 10 may determine that the human in image preview 60D is making an initial touch with the ground after a jump. Finally, computing device 10 may determine that the human in image preview 60E is crouching as a result of landing after a jump due to the force of the landing. At this point, once computing device 10 determines that the visual token in image preview 60E is completing the action, computing device 10 may cease capturing the images. Computing device 10 may then select a captured image based on image preview 60C where the status of the human in image preview 60C matches the definitions of jumping in an action model. Computing device 10 may then output image 62 as the selected image of the human jumping.

Figure 4:
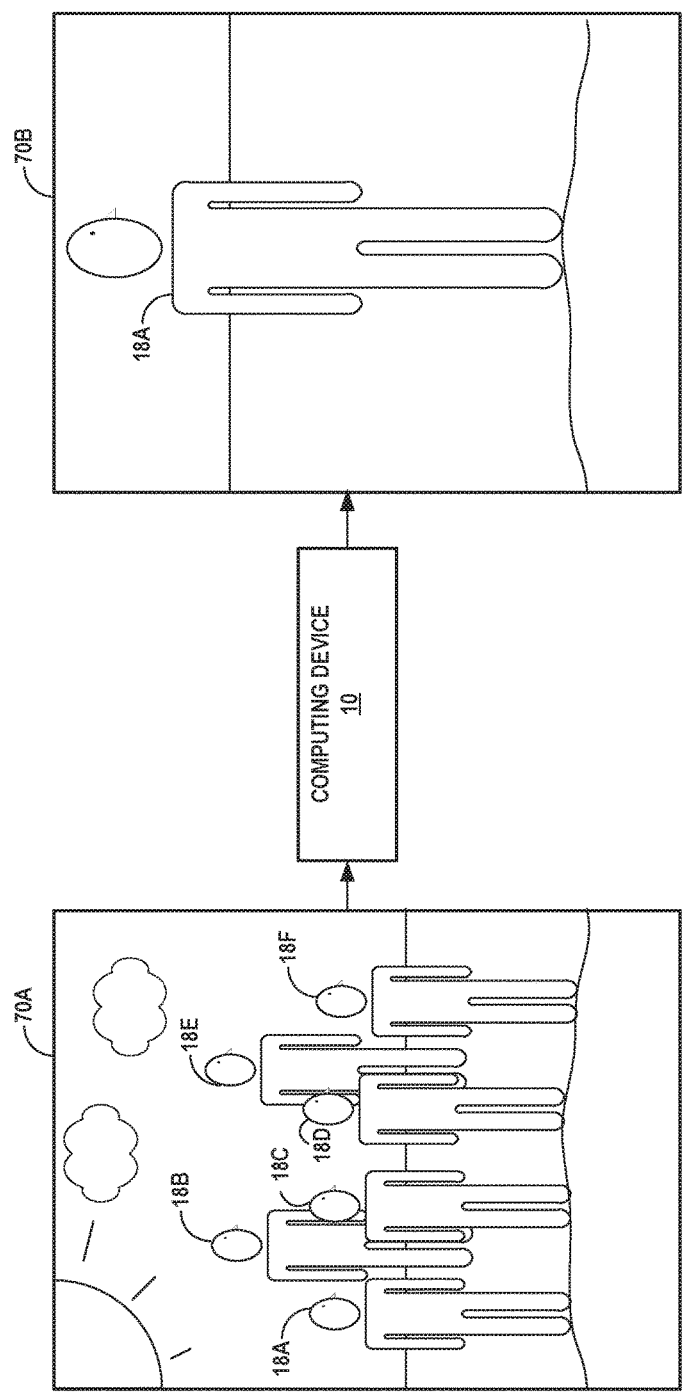
FIG. 4 is another conceptual diagram illustrating a second example image capture command executable by a computing device.

FIG. 4 is another conceptual diagram illustrating a second example image capture command executable by a computing device. The operations of computing device 10 are described within the context of system 1 of FIG. 1 and computing device 10 of FIG. 2. The conceptual diagram of FIG. 4 includes example image preview 70A, which is meant to show an example image previewed by camera 30 of computing device 10 when computing device 10 receives an image capture command.

In the example of FIG. 4, the image capture command may include capturing an image of the leftmost subject 18A of the plurality of subjects 18A-18F in image preview 70A. In such an example, computing device 10 may capture a portion of image preview 70A that includes only leftmost subject 18A. Computing device 10 may analyze image preview 70A to determine a location of each of subjects 18 relative to one another. Based on this analysis, computing device 10 may determine that subject 18A is the leftmost of subjects 18 within image preview 70A. As such, computing device 10 may crop image preview 70A such that subject 18A is in the center of the image preview and the main, or only, subject of the image preview. Computing device 10 may then capture image 70B based on the updated image preview. Computing device 10 may output image 70B, which includes a cropped version of image preview 70A that gives the illusion of zooming in on subject 18A.

Figure 5:
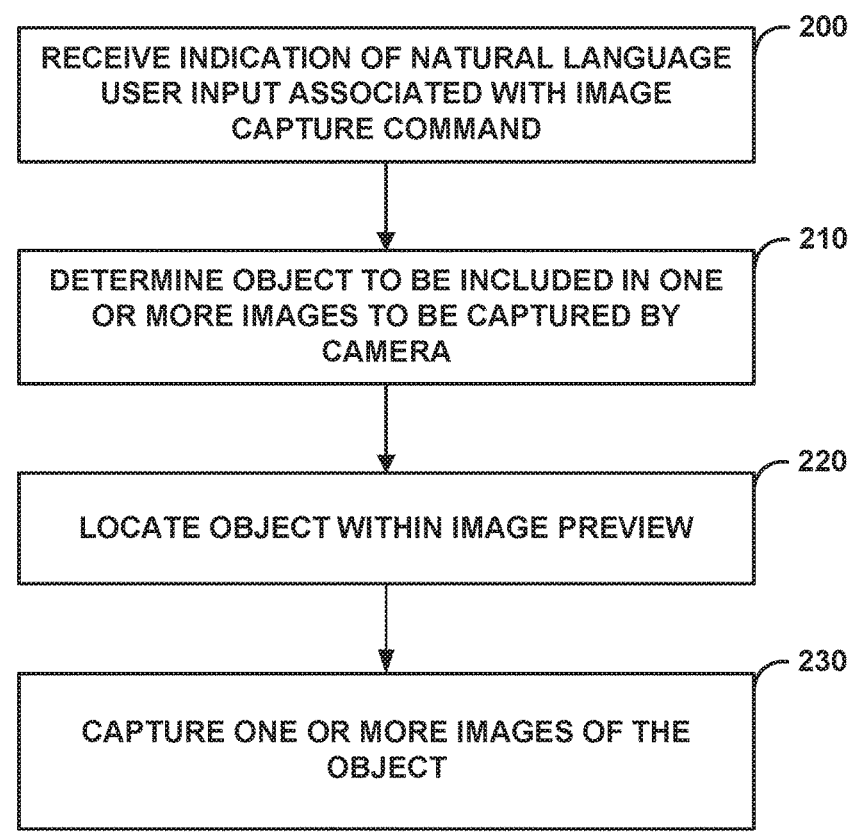
FIG. 5 is a flowchart illustrating example operations of an example computing device configured to receive an indication of a natural language user input associated with an image capture command and execute the image capture command, in accordance with one or more aspects of the present disclosure.

FIG. 5 is a flowchart illustrating example operations of an example computing device configured to receive an indication of a natural language user input associated with an image capture command and execute the image capture command, in accordance with one or more aspects of the present disclosure. The operations of computing device 10 are described within the context of system 1 of FIG. 1 and computing device 10 of FIG. 2.

In accordance with the techniques of this disclosure, computing device 10 may perform various functions while operating in the image capture mode. While operating in the image capture mode, computing device 10 may receive an indication of a natural language user input associated with an image capture command (200). For instance, in the example of FIG. 5, a user of computing device 10 may speak a natural language user input into microphone 32, where the natural language user input includes the image capture command. Microphone 32 may convert the natural language user input into a computer-readable output, such as a message, a sequence of bits, or an electrical signal. Computing device 10 may analyze the output of microphone 32 to determine the image capture command. In the example of FIG. 5, the image capture command may be an instruction to capture an image of a visual token including a particular object (e.g., a human) while the particular object is performing a particular action (e.g., shooting a basketball). In other instances, the image capture command may be to crop one or more images to fit around the particular visual token or to focus camera 30 on the particular visual token and capture one or more images focused on the particular visual token.

Computing device 10 may determine, based on the image capture command, a visual token to be included in one or more images to be captured by camera 30 of computing device 10 (210). For instance, computing device 10 may parse the natural language user input into two or more distinct portions: a specific image capture command, as well as a particular visual token or multiple visual tokens that will be the subject of one or more images captured by camera 30 using the specific image capture command. In the example of FIG. 5, the visual token included in the natural language user input is the human. As such, computing device 10 may determine that the visual token that will be the subject of one or more images captured by camera 30 using the specific image capture command is a human located within an image preview.

Computing device 10 may locate the visual token within an image preview output by computing device 10 via UID 12 of computing device 10 while operating in the image capture mode (220). As stated above, computing device 10 may determine that a human shooting a basketball is the visual token to be captured in one or more images by camera 30. Computing device 10 may scan an image preview to locate and determine a human within the image preview.

In some instances, in locating the visual token, computing device 10 may match the natural language user input with a first referential visual token of one or more referential visual tokens from referential visual tokens 24 of predetermined tokens. Computing device 10 may compare the first referential visual token with each of one or more visual tokens within the image preview and determine the visual token that most closely matches the first referential visual token is the visual token to be included in the one or more images to be captured. For instance, in the image preview, computing device 10 may recognize the human, a wooden court, and a basketball. Computing device 10 may determine respective referential visual tokens identifying each of the three recognized objects. Computing device 10 may match the determined visual tokens with the visual token identified from the image capture command (i.e., the human) and determine that the visual token that matches the human is the visual token to be captured in the one or more images.

In some instances, the one or more visual tokens determined by computing device 10 may be current visual tokens. In such instances, using future visual token model 26, computing device 10 may determine one or more expected future visual tokens. As described above, future visual token model 26 may describe relationships between one or more subsets of visual tokens. Based on the current visual tokens 24 and the relationships within future visual token model 26, computing device 10 may determine one or more expected future visual tokens. For instance, based on the current visual tokens of the human, the wooden court, and the basketball, computing device 10 may determine that the scene may be a basketball court, and that a visual token of a defender human player or a basketball hoop is expected in a future image preview.

In some examples, computing device 10 may update future visual token model 26 based on various information. For instance, computing device 10 may determine one or more actual future visual tokens associated with a respective visual token of the one or more visual tokens in a second image preview generated after the original image preview. Computing device 10 may compare the one or more actual future visual tokens with the one or more expected future visual tokens previously determined. Computing device 10 may then update future visual token model 26 based on this comparison. For instance, in the example of FIG. 5, computing device 10 determined a basketball hoop to be an expected future visual token. If computing device 10 analyzes a second image preview and determines that a basketball hoop is now present within the second image preview, computing device 10 may update future visual token model 26 by increasing the future likelihood of determining a basketball hoop to be present when a human, a wooden court, and a basketball is present, confirming the previous prediction.

In other instances, computing device 10 may update future visual token model 26 based on crowdsourced visual token data. For instance, computing device 10 may receive crowdsourced visual token data that includes a set of one or more expected future visual tokens associated with the one or more current visual tokens for one or more crowdsourced computing devices different than computing device 10. The crowdsourced data may be based on users with similar interests as a user of computing device 10. For instance, the user of computing device 10 may frequently take pictures of basketball games. Given computing device 10's attempts to determine expected future visual tokens based on the current visual token of a human, a wooden court, and a basketball, computing device 10 may receive crowdsourced visual token data from computing devices associated with users who also frequently take pictures of basketball games. Computing device 10 may update future visual token model 26 based on this crowdsourced visual token data from users with similar interests as the user, as it is expected that users with similar interests may encounter similar visual tokens in their captured images.

Using the visual token location and the image capture command determined by computing device 10, computing device 10 may capture one or more images of the visual token (230). For instance, computing device 10 may receive the image capture command and the location of the human within the image preview. Computing device 10 may utilize camera 30 to execute the image capture command and capture one or more images of the human. In some examples, computing device 10 may use camera 30 to capture one or more images of the human once the human is fully located within the image preview. In some other examples, computing device 10 may focus camera 30 on the human and keep the zoom level of camera 30 consistent. In some instances of such examples, computing device 10 may crop the captured image to provide an illusion of zooming camera 30 in on the human. In still other examples, computing device 10 may zoom camera 30 onto the human such that the human is the center of the captured image.

In the example of FIG. 5, the image capture command includes capturing one or more images of the visual token including a particular object (i.e., the human) performing a particular action (i.e., shooting the basketball). In such instances, to execute the image capture command, computing device 10 may monitor the image preview to determine when the particular object is beginning to perform the particular action. Once computing device 10 determines that the particular object is beginning to perform the particular action, computing device 10 may capture the one or more images of the object and store the one or more images of the object in image queue 28. Computing device 10 may cease capturing images of the object once computing device 10 determines the object in the image preview is no longer performing the particular action. Computing device 10 may then analyze each of the one or more images in image queue 28 to determine a status of the object within the respective image. Computing device 10 may select a first image of the one or more images when a status of the object in the first image most closely matches the particular objecting being in the middle of performing the particular action based on action model 29.

For instance, in the example of FIG. 5 where the image capture command includes capturing an image of the human shooting the basketball, computing device 10 may determine if the human is standing, if the human is jumping, if the human is catching the basketball, if the human is letting go of the basketball, etc. Computing device 10 may determine a location of a visual token associated with the basketball with relation to the human's hand. Action model 29 may include data associated with the action of shooting the basketball, such as requiring the basketball and the human to both be present in the image, that the ball should be in the human's hand, that the human should be mid-jump, and any other information that could depict the human shoot the basketball. Once computing device 10, using action model 29, determines that the human in the image preview is beginning to jump, computing device 10 may begin to capture a series of images of the human. Computing device 10 may cease capturing images of the human when the human in the image preview lands from jumping. Computing device 10 may analyze each image of the series of images to determine a status of the human. Computing device 10 may then select the first image of the one or more images where the status of the human matches the requirements of action model 29. For instance, computing device 10 may select the image where the human is mid-air and the basketball is located in the human's hands.

Computing device 10 may update action model 29 based on user feedback. For instance, computing device 10 may present the first image selected by computing device 10 and prompt for an indication of user input to either confirm the first image or decline the first image. If computing device 10 receives an indication of user input confirming the first image, computing device 10 may store the first image to memory and update action model 29 to reinforce the analysis and determinations of the human performing the specific act of shooting the basketball. If, however, computing device 10 receives an indication of user input declining the first image, computing device 10 may update action model 29 to decrease the associations between the human and the basketball as currently defined. Computing device 10 may select one or more additional images of the human in the process of shooting the basketball and utilize computing device 10 to present the one or more additional images. Computing device 10 may receive an additional indication of user input selecting a second image of the one or more additional images and update action model 29 based on the updated selection.

Example 1

A method comprising: while a computing device is operating in an image capture mode: receiving, by the computing device, an indication of a natural language user input associated with an image capture command; determining, by the computing device, based on the image capture command, a visual token to be included in one or more images to be captured by a camera of the computing device; locating, by the computing device, the visual token within an image preview output by the computing device while operating in the image capture mode; and capturing, by the computing device, one or more images of the visual token.

Example 2

The method of example 1, wherein locating the visual token comprises: matching, by the computing device, the natural language user input with a first referential visual token of one or more referential visual tokens from a model of predetermined tokens; comparing, by the computing device, the first referential visual token with each of one or more visual tokens within the image preview; and determining, by the computing device, that the visual token that most closely matches the first referential visual token is the visual token to be included in the one or more images to be captured.

Example 3

The method of example 2, wherein the one or more visual tokens comprise one or more current visual tokens, wherein the method further comprises: determining, by the computing device and based at least on part on the one or more current visual tokens, a future visual token model, and one or more relationships between one or more subsets of the one or more current visual tokens, one or more expected future visual tokens.

Example 4

The method of example 3, further comprising: determining, by the computing device, the one or more relationships between the one or more subsets of the one or more current visual tokens based at least in part on a hidden Markov model.

Example 5

The method of any of examples 3-4, wherein the image preview comprises a first image preview, and wherein the method further comprises: determining, by the computing device, one or more actual future visual tokens associated with a respective visual token of one or more visual tokens within a second image preview, wherein the second image preview is generated after the first image preview; comparing, by the computing device, the one or more actual future visual tokens and the one or more expected future visual tokens; and updating, by the computing device, the future visual token model based on the comparison between the one or more actual future visual tokens and the one or more expected future visual tokens.

Example 6

The method of example 5, further comprising: receiving, by the computing device, crowdsourced visual token data comprising a set of one or more expected future visual tokens associated with the one or more current visual tokens for one or more crowdsourced computing devices different than the computing device; and updating, by the computing device, the future visual token model based on the crowdsourced visual token data.

Example 7

The method of any of examples 1-6, wherein the image capture command comprises capturing the one or more images of the visual token comprising an object performing a particular action.

Example 8

The method of example 7, wherein executing the image capture command comprises: determining, by the computing device, a first time at which the object in the image preview begins performing the particular action; beginning to capture, by the computing device, the one or more images of the object at the first time; determining, by the computing device, a second time at which the object in the image preview completes performing the particular action; ceasing to capture, by the computing device, the one or more images of the object at the second time; analyzing, by the computing device, each of the one or more images to determine a status of the object within the respective image; and selecting, by the computing device and based on an action model, a first image of the one or more images, wherein a status of the object of the first image most closely matches the particular action.

Example 9

The method of example 8, further comprising: outputting, by the computing device and for display at a display device operatively connected to the computing device, the first image; prompting, by the computing device, for an indication of user input to either confirm the first image or decline the first image; responsive to receiving an indication of user input confirming the first image, storing, by the computing device, the first image to a memory of the computing device; and responsive to receiving an indication of user input declining the first image: updating, by the computing device, the action model based on the indication of user input declining the first image; outputting, by the computing device and for display at the display device, one or more additional images of the one or more images of the visual token; receiving, by the computing device, an additional indication of user input selecting a second image, wherein the second image is included in the one or more additional images; and updating, by the computing device, the action model based on the selection of the second image.

Example 10

The method of any of examples 1-9, wherein the image capture command comprises one of cropping, by the computing device, the one or more images to fit around the visual token or focusing, by the computing device, the one or more images on the visual token.

Example 11

The method of any of examples 1-10, wherein the visual token comprises at least one of an object, a person, an action, a location, or a concept.

Example 12

The method of any of examples 1-11, wherein the natural language user input comprises a spoken user input.

Example 13

A computing device comprising: a camera; at least one processor; and at least one non-transitory computer-readable storage medium storing instructions that are executable by the at least one processor to: while the computing device is operating in an image capture mode: receive an indication of a natural language user input associated with an image capture command; determine based on the image capture command, a visual token to be included in one or more images to be captured by the camera; locate the visual token within an image preview output by the computing device while operating in the image capture mode; and capture one or more images of the visual token.

Example 14

The computing device of example 13, wherein the instructions executable by the at least one processor to locate the visual token comprise instructions executable by the at least one processor to: match the natural language user input with a first referential visual token of one or more referential visual tokens from a model of predetermined tokens; compare the first referential visual token with each of one or more visual tokens within the image preview; and determine that the visual token that most closely matches the first referential visual token is the visual token to be included in the one or more images to be captured.

Example 15

The computing device of example 14, wherein the one or more visual tokens comprise one or more current visual tokens, wherein the instructions are further executable by the at least one processor to: determine, based at least on part on the one or more current visual tokens, a future visual token model, and one or more relationships between one or more subsets of the one or more current visual tokens, one or more expected future visual tokens.

Example 16

The computing device of example 15, wherein the instructions are further executable by the at least one processor to: determine the one or more relationships between the one or more subsets of the one or more current visual tokens based at least in part on a hidden Markov model.

Example 17

The computing device of any of examples 14-15, wherein the image preview comprises a first image preview, and wherein the instructions are further executable by the at least one processor to: determine one or more actual future visual tokens associated with a respective visual token of one or more visual tokens within a second image preview, wherein the second image preview is generated after the first image preview; compare the one or more actual future visual tokens and the one or more expected future visual tokens; and update the future visual token model based on the comparison between the one or more actual future visual tokens and the one or more expected future visual tokens.

Example 18

The computing device of example 17, wherein the instructions are further executable by the at least one processor to: receive crowdsourced visual token data comprising a set of one or more expected future visual tokens associated with the one or more current visual tokens for one or more crowdsourced computing devices different than the computing device; and update the future visual token model based on the crowdsourced visual token data.

Example 19

The computing device of any of examples 13-18, wherein the image capture command comprises capturing the one or more images of the visual token comprising an object performing a particular action.

Example 20

The computing device of example 19, wherein the instructions executable by the at least one processor to execute the image capture command comprise instructions executable by the at least one processor to: determine a first time at which the object in the image preview begins performing the particular action; begin to capture the one or more images of the object at the first time; determine a second time at which the object in the image preview completes performing the particular action; cease to capture the one or more images of the object at the second time; analyze each of the one or more images to determine a status of the object within the respective image; and select, based on an action model, a first image of the one or more images, wherein a status of the object of the first image most closely matches the particular action.

Example 21

The computing device of example 20, wherein the instructions are further executable by the at least one processor to: output, for display at a display device operatively connected to the computing device, the first image; prompt for an indication of user input to either confirm the first image or decline the first image; responsive to receiving an indication of user input confirming the first image, store the first image to a memory of the computing device; and responsive to receiving an indication of user input declining the first image: update the action model based on the indication of user input declining the first image; output, for display at the display device, one or more additional images of the one or more images of the visual token; receive an additional indication of user input selecting a second image, wherein the second image is included in the one or more additional images; and update the action model based on the selection of the second image.

Example 22

The computing device of any of examples 13-21, wherein the image capture command comprises one of cropping, by the computing device, the one or more images to fit around the visual token or focusing, by the computing device, the one or more images on the visual token.

Example 23

The computing device of any of examples 13-22, wherein the visual token comprises at least one of an object, a person, an action, a location, or a concept.

Example 24

The computing device of any of examples 13-23, wherein the natural language user input comprises a spoken user input.

Example 25

A non-transitory computer-readable storage medium storing instructions that, when executed, cause at least one processor of a computing device to: while the computing device is operating in an image capture mode: receive an indication of a natural language user input associated with an image capture command; determine based on the image capture command, an visual token to be included in one or more images to be captured by a camera of the computing device; locate the visual token within an image preview output by the computing device while operating in the image capture mode; and capture one or more images of the visual token.

Example 26

The non-transitory computer-readable storage medium of example 25, wherein the instructions that cause the at least one processor to locate the visual token comprise instructions that cause the at least one processor to: match the natural language user input with a first referential visual token of one or more referential visual tokens from a model of predetermined tokens; compare the first referential visual token with each of one or more visual tokens within the image preview; and determine that the visual token that most closely matches the first referential visual token is the visual token to be included in the one or more images to be captured.

Example 27

The non-transitory computer-readable storage medium of example 26, wherein the one or more visual tokens comprise one or more current visual tokens, wherein the image preview comprises a first image preview, and wherein the instructions further cause the at least one processor to: determine, based at least on part on the one or more current visual tokens, a future visual token model, and one or more relationships between one or more subsets of the one or more current visual tokens, one or more expected future visual tokens; determine one or more actual future visual tokens associated with a respective object of one or more objects within a second image preview, wherein the second image preview is generated after the first image preview; compare the one or more actual future visual tokens and the one or more expected future visual tokens; and update the future visual token model based on the comparison between the one or more actual future visual tokens and the one or more expected future visual tokens.

Example 28

The non-transitory computer-readable storage medium of any of examples 25-27, wherein the image capture command comprises capturing the one or more images of the visual token comprising an object performing a particular action, wherein the instructions that cause the at least one processor to execute the image capture command comprise instructions that cause the at least one processor to: determine a first time at which the object in the image preview begins performing the particular action; begin to capture the one or more images of the object at the first time; determine a second time at which the object in the image preview completes performing the particular action; cease to capture the one or more images of the object at the second time; analyze each of the one or more images to determine a status of the object within the respective image; and select, based on an action model, a first image of the one or more images, wherein a status of the object of the first image most closely matches the particular action.

Example 29

The non-transitory computer-readable storage medium of example 28, wherein the instructions further cause the at least one processor to: present, for display on a display device operatively connected to the computing device, the first image; prompt for an indication of user input to either confirm the first image or decline the first image; responsive to receiving an indication of user input confirming the first image, store the first image to a memory of the computing device; and responsive to receiving an indication of user input declining the first image; update the action model based on the indication of user input declining the first image; present, for display on the display device, one or more additional images of the one or more images of the visual token; receive an additional indication of user input selecting a second image, wherein the second image is included in the one or more additional images; and update the action model based on the selection of the second image.

Example 30

The non-transitory computer-readable storage medium of any of examples 25-29, wherein the image capture command comprises one of cropping, by the computing device, the one or more images to fit around the visual token or focusing, by the computing device, the one or more images on the visual token.

Example 31

A computing device configured to perform any of the methods of examples 1-12.

Example 32

A computing device comprising means for performing any of the methods of examples 1-12.

Example 33

A computer-readable storage medium encoded with instructions for causing one or more programmable processors to perform any of the methods or examples 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
   while a computing device is operating in an image capture mode:
   receiving, by the computing device, an indication of a natural language user input associated with an image capture command;
   determining, by the computing device, based on the image capture command, a visual token to be included in one or more images to be captured by a camera of the computing device;
   locating, by the computing device, the visual token within an image preview output by the computing device while operating in the image capture mode after having received the indication of the natural language user input; and
   capturing, by the computing device, one or more images of the visual token once at least part of the visual token is included within the image preview.

2. The method of claim 1, wherein locating the visual token comprises:
   matching, by the computing device, the natural language user input with a first referential visual token of one or more referential visual tokens from a model of predetermined tokens;
   comparing, by the computing device, the first referential visual token with each of one or more visual tokens within the image preview; and
   determining, by the computing device, that the visual token that most closely matches the first referential visual token is the visual token to be included in the one or more images to be captured.

3. The method of claim 2, wherein the one or more visual tokens comprise one or more current visual tokens, wherein the method further comprises:
   determining, by the computing device and based at least on part on the one or more current visual tokens, a future visual token model, and one or more relationships between one or more subsets of the one or more current visual tokens, one or more expected future visual tokens.

4. The method of claim 3, further comprising:
   determining, by the computing device, the one or more relationships between the one or more subsets of the one or more current visual tokens based at least in part on a hidden Markov model.

5. The method of claim 3, wherein the image preview comprises a first image preview, and wherein the method further comprises:
  determining, by the computing device, one or more actual future visual tokens associated with a respective visual token of one or more visual tokens within a second image preview, wherein the second image preview is generated after the first image preview;
  comparing, by the computing device, the one or more actual future visual tokens and the one or more expected future visual tokens; and
  updating, by the computing device, the future visual token model based on the comparison between the one or more actual future visual tokens and the one or more expected future visual tokens.

6. The method of claim 5, further comprising:
  receiving, by the computing device, crowdsourced visual token data comprising a set of one or more expected future visual tokens associated with the one or more current visual tokens for one or more crowdsourced computing devices different than the computing device; and
  updating, by the computing device, the future visual token model based on the crowdsourced visual token data.

7. The method of claim 1, wherein the image capture command comprises capturing the one or more images of the visual token comprising an object performing a particular action.

8. The method of claim 7, wherein executing the image capture command comprises:
  determining, by the computing device, a first time at which the object in the image preview begins performing the particular action;
  beginning to capture, by the computing device, the one or more images of the object at the first time;
  determining, by the computing device, a second time at which the object in the image preview completes performing the particular action;
  ceasing to capture, by the computing device, the one or more images of the object at the second time;
  analyzing, by the computing device, each of the one or more images to determine a status of the object within the respective image; and
  selecting, by the computing device and based on an action model, a first image of the one or more images, wherein a status of the object of the first image most closely matches the particular action.

9. The method of claim 8, further comprising:
  outputting, by the computing device and for display at a display device operatively connected to the computing device, the first image;
  prompting, by the computing device, for an indication of user input to either confirm the first image or decline the first image;
  responsive to receiving an indication of user input confirming the first image, storing, by the computing device, the first image to a memory of the computing device; and
  responsive to receiving an indication of user input declining the first image:
    updating, by the computing device, the action model based on the indication of user input declining the first image;
    outputting, by the computing device and for display at the display device, one or more additional images of the one or more images of the visual token;
    receiving, by the computing device, an additional indication of user input selecting a second image, wherein the second image is included in the one or more additional images; and
    updating, by the computing device, the action model based on the selection of the second image.

10. The method of claim 1, wherein the image capture command comprises one of cropping, by the computing device, the one or more images to fit around the object or focusing, by the computing device, the one or more images on the object.

11. The method of claim 1, wherein the visual token comprises at least one of an object, a person, an action, a location, or a concept.

12. The method of claim 1, wherein the natural language user input comprises a spoken user input.

13. A computing device comprising: a camera;
  at least one processor; and
  at least one non-transitory computer-readable storage medium storing instructions that are executable by the at least one processor to:
    while the computing device is operating in an image capture mode:
    receive an indication of a natural language user input associated with an image capture command;
    determine based on the image capture command, a visual token to be included in one or more images to be captured by the camera;
    locate the visual token within an image preview output by the computing device while operating in the image capture mode after having received the indication of the natural language user input; and
    capture one or more images of the visual token once at least part of the visual token is included within the image preview.

14. The computing device of claim 13, wherein the instructions executable by the at least one processor to locate the visual token comprise instructions executable by the at least one processor to:
  match the natural language user input with a first referential visual token of one or more referential visual tokens from a model of predetermined tokens;
  compare the first referential visual token with each of one or more visual tokens within the image preview; and
  determine that the visual token that most closely matches the first referential visual token is the visual token to be included in the one or more images to be captured.

15. The computing device of claim 14, wherein the one or more visual tokens comprise one or more current visual tokens, wherein the instructions are further executable by the at least one processor to:
  determine, based at least on part on the one or more current visual tokens, a future visual token model, and one or more relationships between one or more subsets of the one or more current visual tokens, one or more expected future visual tokens.

16. The computing device of claim 15, wherein the instructions are further executable by the at least one processor to:
  determine the one or more relationships between the one or more subsets of the one or more current visual tokens based at least in part on a hidden Markov model.

17. The computing device of claim 15, wherein the image preview comprises a first image preview, and wherein the instructions are further executable by the at least one processor to:

determine one or more actual future visual tokens associated with a respective visual token of one or more visual token s within a second image preview, wherein the second image preview is generated after the first image preview;

compare the one or more actual future visual tokens and the one or more expected future visual tokens; and update the future visual token model based on the comparison between the one or more actual future visual tokens and the one or more expected future visual tokens.

18. The computing device of claim 17, wherein the instructions are further executable by the at least one processor to:

receive crowdsourced visual token data comprising a set of one or more expected future visual tokens associated with the one or more current visual tokens for one or more crowdsourced computing devices different than the computing device; and update the future visual token model based on the crowdsourced visual token data.

19. The computing device of claim 13, wherein the image capture command comprises capturing the one or more images of the visual token comprising an object performing a particular action, wherein the instructions executable by the at least one processor to execute the image capture command comprise instructions executable by the at least one processor to:

determine a first time at which the object in the image preview begins performing the particular action;

begin to capture, by the computing device, the one or more images of the object at the first time;

determine a second time at which the object in the image preview completes performing the particular action;

cease to capture, by the computing device, the one or more images of the object at the second time;

analyze each of the one or more images to determine a status of the object within the respective image;

select, based on an action model, a first image of the one or more images, wherein a status of the object of the first image most closely matches the particular action;

output, for display on the display device operatively connected to the computing device, the first image;

prompt for an indication of user input to either confirm the first image or decline the first image;

responsive to receiving an indication of user input confirming the first image, store the first image to a memory of the computing device; and responsive to receiving an indication of user input declining the first image:

update the action model based on the indication of user input declining the first image;

output, for display at the display device, one or more additional images of the one or more images of the visual token;

receive an additional indication of user input selecting a second image, wherein the second image is included in the one or more additional images; and update the action model based on the selection of the second image.

20. A non-transitory computer-readable storage medium storing instructions that, when executed, cause at least one processor of a computing device to:

while the computing device is operating in an image capture mode:

receive an indication of a natural language user input associated with an image capture command;

determine based on the image capture command, a visual token to be included in one or more images to be captured by a camera of the computing device;

locate the visual token within an image preview output by the computing device while operating in the image capture mode alter having received the indication of the natural language user input; and capture one or more images of the visual token once at least part of the visual token is included within the image preview.

* * * * *